United States Patent [19]
Dreher

[11] Patent Number: 6,087,745
[45] Date of Patent: Jul. 11, 2000

[54] ROTOR WINDING FOR AN ELECTRICAL MACHINE AND METHOD FOR OPERATING THE ROTOR WINDING

[75] Inventor: Thomas Dreher, Oberhausen, Germany

[73] Assignee: Siemens Aktiengesellschaft, Munich, Germany

[21] Appl. No.: 09/174,731

[22] Filed: Oct. 19, 1998

Related U.S. Application Data

[63] Continuation of application No. PCT/DE97/00734, Apr. 10, 1997.

[30] Foreign Application Priority Data

Apr. 17, 1996 [DE] Germany .......................... 196 15 194

[51] Int. Cl.[7] ............................... H02K 3/24; H02K 3/46
[52] U.S. Cl. ........................... 310/58; 310/59; 310/60 R; 310/61; 310/270
[58] Field of Search .................................. 310/52, 58, 59, 310/60 R, 61, 60 A, 65, 91, 208, 260, 270, 261; 29/596, 598

[56] References Cited

U.S. PATENT DOCUMENTS

| | | | |
|---|---|---|---|
| 2,778,959 | 1/1957 | Kilner | 310/61 |
| 2,833,944 | 5/1958 | Willyoung | 310/59 |
| 2,844,746 | 7/1958 | Coggeshall | 310/260 |
| 4,543,503 | 9/1985 | Kaminski et al. | 310/59 |
| 4,656,382 | 4/1987 | Moore et al. | 310/270 |
| 4,709,177 | 11/1987 | Kaminski | 310/59 |
| 5,777,406 | 7/1998 | Bomba et al. | 310/61 |

FOREIGN PATENT DOCUMENTS

| | | |
|---|---|---|
| 0 250 980 A1 | 1/1988 | European Pat. Off. . |
| 0 160 887 B1 | 8/1990 | European Pat. Off. . |
| 0 166 990 A1 | 1/1996 | European Pat. Off. . |
| 1 036 370 | 8/1958 | Germany . |
| 1 146 186 | 3/1963 | Germany . |
| 1 613 196 | 1/1971 | Germany . |
| 37 00 508 C2 | 6/1992 | Germany . |

*Primary Examiner*—Nestor Ramirez
*Assistant Examiner*—Tran N Nguyen
*Attorney, Agent, or Firm*—Herbert L. Lerner; Laurence A. Greenberg; Werner H. Stemer

[57] ABSTRACT

A rotor winding for an electrical machine, in particular an air-cooled turbogenerator, includes a rotation axis and a multiplicity of electrically conductive turns which are stacked radially relative to the rotation axis and form a plurality of axial sections and tangential sections. Each axial section is formed approximately in a straight line, is aligned approximately parallel to the rotation axis and has first cooling channels which are aligned meridionally relative to the rotation axis and pass through all of the turns. Each tangential section is bent about the rotation axis, connects two axial sections to one another and has associated second cooling channels, each of which is located in the interior of a respective turn. If required, third cooling channels, each of which is constructed in such a way that it meanders meridionally, are provided at the axial sections. A method for operating the rotor winding includes rotating the rotor winding about the rotation axis, conducting electrical current through the rotor winding, and cooling the rotor winding with a gaseous coolant, especially air, flowing through the cooling channels.

11 Claims, 2 Drawing Sheets

ROTOR WINDING FOR AN ELECTRICAL MACHINE AND METHOD FOR OPERATING THE ROTOR WINDING

CROSS-REFERENCE TO RELATED APPLICATION

This application is a continuation of copending International Application No. PCT/DE97/00734, filed on Apr. 10, 1997, which designated the United States.

BACKGROUND OF THE INVENTION

Field of the Invention

The invention relates to a rotor winding for an electrical machine, having a rotor axis and a multiplicity of electrically conductive turns stacked radially relative to the rotation axis and forming a plurality of axial sections as well as a plurality of tangential sections, each axial section formed approximately straight, aligned approximately parallel to the rotation axis and having associated first cooling channels aligned meridionally relative to the rotation axis and passing through all of the turns, and each tangential section bent about the rotation axis, connecting two axial sections to one another and having associated second cooling channels.

Such a rotor winding is based on European Patent 0 160 887 B1, German Patent DE 37 00 508 C2, German Published, Prosecuted Patent Application DE-AS 10 11 048 and an article from "Electrical Times", dated Mar. 10, 1966, page 354.

A "meridional" direction with respect to an axis is a direction which lies on a plane containing the axis. A direction is accordingly meridional if it can be composed of a component which is radial with respect to the axis and of a component which is parallel to the axis. Such a use of the term "meridional" largely corresponds to the use in the field of gas turbines and in the field of geodesy.

References to the construction, the production and the use of a rotor winding, in particular a rotor winding which is intended for a dynamo-electrical machine such as a turbogenerator, are based on an article entitled "Lauferwicklungen fur Turbogeneratoren" [Rotor Windings for Turbogenerators] by D. Lambrecht, contained in a book by H. Sequenz entitled "Herstellung der Wicklungen elektrischer Maschinen" [Production of Windings for Electrical Machines], Springer Press, Vienna and New York 1973, pages 169–199. German Published, Non-Prosecuted Patent Application DE-OS 16 13 196, German Published, Prosecuted Patent Application DE-AS 10 36 370, Published European Patent Application 0 166 990 A1 and Published European Patent Application 0 250 980 A1 are also of interest. German Published, Prosecuted Patent Application DE-AS 11 46 186 relates to a turbogenerator having a rotor winding which uses direct conductor cooling. A tangential section is connected at right angles to an axial section. The tangential section is cooled indirectly, and the axial section is constructed as a hollow conductor, through which cooling fluid flows.

European Patent 0 160 887 B1, which was mentioned initially, discloses a rotor winding, some of the axial sections of which are located within a rotor body, namely within slots which are provided in the rotor body, and some of which are located outside the rotor body. At both axial ends of the rotor body, the respective parts of the axial sections which are located outside the rotor body, together with the tangential sections, form so-called end windings, in which a tangential section in each case connects two axial sections to one another, and which are disposed outside a respective shaft, that projects from the rotor body along the rotation axis. The entire rotor winding is cooled through the use of a cooling gas, in particular air or hydrogen. The cooling of the end windings of the rotor winding is of particular interest, and that cooling is carried out by the cooling gas passing through meandering cooling channels which are formed by the end windings themselves and fillers that rest against the end windings and in which corresponding slots are provided. Such a rotor winding has been found to be particularly successful in practical use and, in particular, has made it possible to operate a turbogenerator, which is equipped with a correspondingly equipped rotor winding, at a rating which is considerably higher than the capabilities of the prior art. Using such a rotor winding, it is possible to operate an air-cooled turbogenerator of an appropriate construction at a rating of up to 300 MVA. If hydrogen is used as the cooling gas, an even higher rating can be achieved, because of its better cooling characteristics.

The article from "Electrical Times", dated Mar. 10, 1966, page 354, describes a rotor of a dynamo-electrical machine having turns. Each turn is guided in a slot in the rotor in an axial section which is bent through 90° outside the slot, and merges into a tangential section. The tangential section and at least one region of the axial section which extends deep into the slot are constructed as a hollow conductor structure and are thus cooled directly by a cooling fluid flowing through the turn. In a further region of the axial section, which is located within the slot, that axial section is cooled by cooling fluid flowing in the radial direction through turns which are located one above the other.

U.S. Pat. No. 4,543,503 describes a cooling air system for rotor windings of a dynamo-electrical machine. End windings of the rotor windings are cooled through a system of communicating cooling channels. Thus, due to a centrifugal effect of the winding rotor, a low pressure zone is generated, by which a pumping effect is produced. Cooling gas is conducted through the cooling system through the use of that pumping effect.

SUMMARY OF THE INVENTION

It is accordingly an object of the invention to provide a rotor winding for an electrical machine and a method for operating the rotor winding, which overcome the hereinafore-mentioned disadvantages of the heretofore-known devices and methods of this general type and in which the rotor winding is structurally simplified while improving its advantageous operating characteristics, in order to achieve a reduction in its production costs, preferably while increasing its rating.

With the foregoing and other objects in view there is provided, in accordance with the invention, a rotor winding for an electrical machine, comprising a rotor axis; and a multiplicity of electrically conductive turns stacked radially relative to the rotation axis, having an interior, and forming a plurality of axial sections as well as a plurality of tangential sections; each axial section formed approximately straight, aligned approximately parallel to the rotation axis, having associated first cooling channels aligned meridionally relative to the rotation axis and passing through all of the turns; and each tangential section bent about the rotation axis, connecting two of the axial sections to one another and having associated second cooling channels, each second cooling channel located in the interior of a respective turn, separated or decoupled, in flow terms, from the associated axial sections of the turn, and discharging in circumferential direction.

Accordingly, the tangential sections are cooled by cooling channels which run in the interior of the turns, insofar as they form the tangential sections. In principle, the axial sections are still cooled by cooling channels which are aligned meridionally, in particular radially. However, under some circumstances this type of cooling is provided only for those parts of the axial sections which are located in the interior of the rotor body, and is combined with a different type of cooling for the parts of the axial sections which are located in the end windings outside the rotor body.

In accordance with another feature of the invention, the axial sections are located partially within slots in a rotor body and partially outside the rotor body, and the tangential sections are preferably all located outside the rotor body.

In this case, the tangential sections form end windings together with those parts of the axial sections which are located outside the rotor body. In each case there is one end winding on each axial end of the rotor body.

In accordance with a further feature of the invention, each first cooling channel is located within a respective slot, that is to say in particular within the rotor body.

In accordance with an added feature of the invention, in this context, at least one third cooling channel is assigned to each axial section between the rotor body and each tangential section which is connected to the axial section, and the third cooling channel meanders approximately meridionally and is disposed outside the axial section.

In accordance with an additional feature of the invention, the third cooling channels are formed in a rotor winding which has a plurality of axial sections that are disposed tangentially side-by-side with respect to the rotation axis, electrically insulating fillers which are disposed between the axial sections are provided with corresponding slots, and each such slot forms a third cooling channel with an adjacent axial section.

In the case of the last embodiment described above, which is preferred above all, there are thus a total of three cooling channel systems, including the first cooling channels for the axial sections within the rotor body, the second cooling channels for the tangential sections in the end windings, and the third cooling channels for the axial sections in the end windings. This embodiment offers a particularly high level of flexibility for practical construction, which is useful for the desired aim of achieving a temperature distribution that is as uniform as possible throughout the rotor winding in a particular manner.

In accordance with yet another feature of the invention, the rotor body has two axial ends, from each of which a respective shaft projects that extends under the respective tangential sections, at each end, and the respective tangential sections are disposed on a respective insulating cylinder which extends as far as the rotor body and is at a distance from the respective shaft. Thus, in this case, the end windings of the rotor winding are in each case disposed on a corresponding insulating cylinder. An intermediate space preferably remains between each insulating cylinder and the respective shaft, and is used in particular for the inlet and outlet for the coolant that is used.

In accordance with yet a further feature of the invention, in this context, each tangential section has a middle and two ends, it is connected at each end to an axial section, and every other cooling channel is open to one end and to the middle, and each insulating cylinder has an associated hole at each end and each middle of a tangential section. The hole leads to an inlet channel or outlet channel, which are formed through the use of radial walls between the insulating cylinder and the shaft. The insulating cylinder need not necessarily be constructed in one piece and can also be formed from individual components, which are not necessarily directly connected to one another. The insulating cylinder is used mainly to provide inlet and/or outlet channels for the cooling gas under the end winding, and for sealing against undesirable inflow or outflow of cooling gas. Alternative embodiments, in particular configurations of T-shaped insulating pieces and the like, may also be used for this purpose.

For the purposes of this embodiment, it is possible to implement so-called four-flow cooling of each end winding, particularly if the axial sections in the end windings are provided in the described manner with third channels which meander meridionally. In this case, the coolant inlet can be provided at the ends of the tangential sections, where they are connected to the axial sections. A first coolant flow then passes from each end, through the second cooling channels, to the middle of the tangential section, and a second flow passes through the third cooling channels in the direction of the rotor body, from where it can leave in a known manner. There are thus four associated coolant flows in each end winding for each tangential section, and for the parts of the axial sections connected to it, thus explaining the term "four-flow cooling".

In accordance with yet an added feature of the invention, the tangential sections and the axial sections are connected in such a manner that each tangential section has two ends, to each of which it is connected, in particular brazed, to one end of an associated axial section. To this end, the axial sections can be manufactured independently of the tangential sections and not connected to them until later. The joint which is to be produced is preferably a brazed joint.

In accordance with yet an additional feature of the invention, in this context, each tangential section is aligned at a constant radius to the rotation axis, which means, in particular, that it can be produced from a straight semi-finished product simply by one-dimensional bending. This embodiment preferably includes the feature that a tangential section abuts approximately at right angles onto each axial section to which it is connected. The rotor winding then has pronounced "corners" at junction points between the tangential sections and the axial sections.

The rotor winding of each embodiment is, in particular, intended for and disposed in an electrical machine, in particular a large dynamo-electrical machine such as a turbogenerator.

With the objects of the invention in view there is also provided a method for operating a rotor winding, which comprises rotating the rotor winding about the rotation axis, conducting electrical current through the rotor winding, and cooling the rotor winding with a gaseous coolant, preferably air, flowing through the cooling channels.

Other features which are considered as characteristic for the invention are set forth in the appended claims.

Although the invention is illustrated and described herein as embodied in a rotor winding for an electrical machine and a method for operating the rotor winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
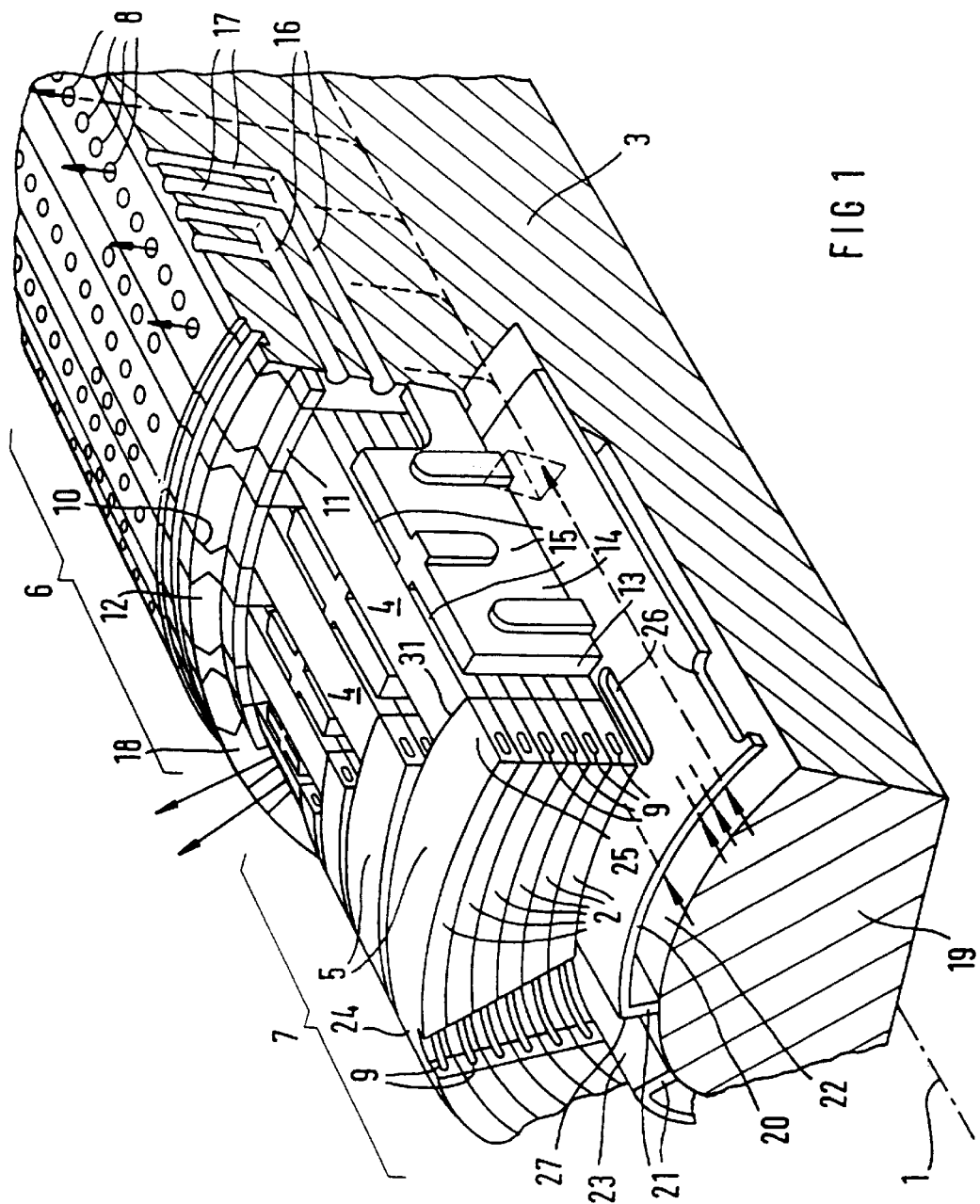
FIG. 1 is a fragmentary, diagrammatic, perspective view of a particularly preferred embodiment of a rotor winding installed on a rotor body.

Reference should be made to the cited documents relating to the prior art, particularly the article by D. Lambrecht, for any possibly required additions to the information which can be seen from the drawing relating to practical implementation of the invention.

Referring now in detail to the figures of the drawings, which are partially diagrammatic and/or slightly distorted in order to emphasize specific features, and first, particularly, to FIG. 1 thereof, there is seen a rotor winding that is axially symmetrical with respect to a rotation axis 1 around which it has to rotate during its operation in an electrical machine, in this case a turbogenerator. The rotor winding also has mirror-image symmetry with respect to a center plane, that is not illustrated but is at right angles to the rotation axis 1. The rotor winding includes a multiplicity of turns 2 which are stacked approximately radially one on top of the other with respect to the rotation axis 1. These turns 2 are electrically connected to one another and form a coil configuration which creates a magnetic field, in particular a stationary magnetic field, during operation.

The rotor winding is mounted on a rotor body 3 which is constructed, in accordance with normal practice, as a metallic monolith. The rotor winding has axial sections 4, each of which is formed approximately in a straight line and is aligned approximately parallel to the rotation axis 1. The rotor winding also has tangential sections 5, each of which is bent about the rotation axis 1 and connects two axial sections 4 to one another. The axial sections 4 are located partially within the rotor body 3. Corresponding parts of the axial sections 4 form a rotor body region 6 of the rotor winding. Those parts of the axial sections 4 which are disposed outside the rotor body 3, as well as the tangential sections 5, form so-called end windings 7, one of which can be seen.

During operation, electrical current of such a magnitude flows through the rotor winding that the current produces a considerable amount of heat because of electrical resistance of the rotor winding. The rotor winding is cooled in order to dissipate this heat, to be precise through the use of a cooling gas. This gas flows through a cooling system in the rotor winding, absorbs the heat which has been produced, and dissipates it. Each axial section 4 has associated first cooling channels 8 for the cooling gas to pass through, although only the mouths thereof can be seen in FIG. 1. Each first cooling channel 8 is aligned meridionally, in particular radially, with respect to the rotation axis 1, and passes through all of the turns 2. Second cooling channels 9 are provided for cooling the tangential sections 5. In this case, each second cooling channel 9 is located in the interior of a respective turn 2, and thus extends along a corresponding tangential section 5, without any direct flow connection to a cooling channel 8 which is in the axial section 4 and can be constructed in any way.

The way in which the rotor winding is mounted in the rotor body 3 will be explained first of all, before describing the details of the cooling system in more detail. The parts of the axial sections 4 in the rotor body region 6 of the rotor winding are disposed in slots 10 in the rotor body 3, with one slot 10 being provided for each axial section 4. Slot head insulation 11, which is constructed in a manner known per se as a spring or to which an additional spring attachment may be added, is located above the axial section 4 in each slot 10. A sealing wedge 12 which is disposed above the slot head insulation 11 seals the slot 10 in a force-locking manner, and fixes the respective axial section 4 in the slot 10, against centrifugal forces which occur to a considerable extent during operation.

In the exemplary embodiment according to FIG. 1, third cooling channels 15 are added to the first cooling channels 8 and to the second cooling channels 9. These third cooling channels 15 are formed with the assistance of insulating fillers 13, each of which maintains a spacing between two axial sections 4 in the end winding 7. Each insulating filler 13 has recesses 14 that define flat slots which form the third cooling channels 15, together with one adjacent axial section 4 in each case. Every third cooling channel 15 extends in a meridionally meandering manner along an axial section 4 and opens into axial holes 16 in the rotor body 3. These axial holes 16, for their part, communicate with radial holes 17 from which cooling gas, which has flowed through the third cooling channels 15, can escape from the rotor body 3. An insulating cylinder 20 is provided under the end winding 7 and at a distance from a shaft piece 19, which extends along the rotation axis 1 from the rotor body 3, starting from one axial end 18. Tangential sections 5 as well as those parts of the axial sections 4 which are part of the end winding 7, are disposed on the insulating cylinder 20. Radial walls 21, which define inlet channels 22 as well as outlet channels 23 for the cooling gas, are provided between the insulating cylinder 20 and the shaft piece 19. In this case, an outlet channel 23 is used for letting out cooling gas which has emerged from the second cooling channels 9 in the region of a respective middle 24 of a tangential section 5. Each tangential section 5 has corresponding recesses for that purpose. In this case, the cooling gas enters the tangential sections 5 at respective ends 25 of the tangential sections from holes 26, which lead to an inlet channel 22 under the insulating cylinder 20. The cooling gas passes into the outlet channel 23 through a hole 27 at the middle or center part 24 of a tangential section 5. The holes 26 which carry the inlet channels 22 are also used for letting cooling gas into the third cooling channels 15.

The system of cooling channels 9 and 15 in each end winding 7 forms four flows of cooling gas, two of which flows pass from the holes 26, along the rotation axis 1, to the rotor body 3, and two further flows of which flow in an approximately tangential direction from the holes 26 to the holes 27. The cooling system may thus be called "four-flow cooling".

As can also clearly be seen from the previous statements, the fillers 13, the insulating cylinder 20 and the walls 21 primarily serve the function of providing a guidance device for the cooling gas which cools the rotor winding. With regard to the formation and function of this guidance device, there is a choice of a large number of basically equivalent alternatives for the breakdown into fillers 13, insulating cylinder 20 and walls 21. In the case of the actual implementation of a rotor as illustrated in FIG. 1, alternative refinements of the guidance device may also be considered, for example from parts having T-shaped cross-sections, each of which, for example, contains a wall and a part of the insulating cylinder.

The axial sections 4 are joined, in particular brazed, to the tangential sections 5 in such a manner that the ends 25 of the tangential sections are connected to ends 31 of the axial sections 4. Butt solder joints which are thus formed, in fact can be produced by using normal specialist devices without any problems and with top quality. Pronounced "corners" of the rotor winding are produced at the ends 25 and 31. The axial sections 4 and tangential sections 5 abut approximately at right angles against the corners, without any flow connection for cooling gas.

The advantages of the rotor winding of the type just described have already been explained, but will be referred to expressly once again at this point. In addition, it should be noted that it is possible to dispense with costly insulating parts between two tangential sections 5 in each case as a result of the tangential sections 5 being provided with the second cooling channels 9. It is no longer necessary to have to use such insulating parts in order to form cooling channels alongside the tangential sections 5.

A cap, with which the end winding 7 must be covered and which supports the end winding 7 against the considerable centrifugal forces that occur during operation, is not shown in FIG. 1. The first cooling channels 8 in the axial sections 4 are also only illustrated diagrammatically. Further information relating to these items can be found in the following description of FIG. 2, which relates to another exemplary embodiment that, in fact, has corresponding parallels to the exemplary embodiment according to FIG. 1.

Figure 2:
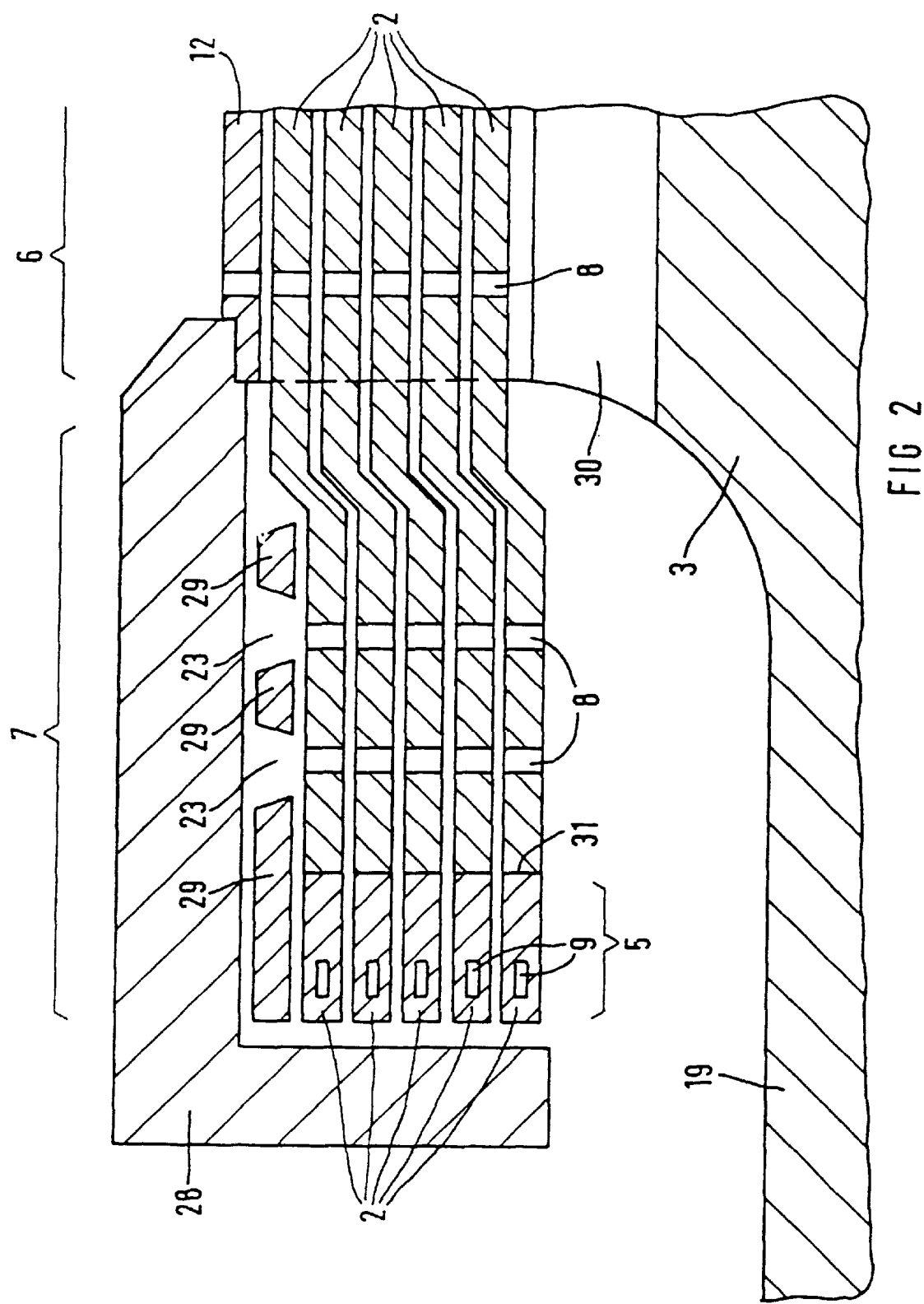
FIG. 2 is an axial, longitudinal-sectional view of a further embodiment of the rotor winding.

FIG. 2 shows an end winding 7 and a part of the rotor body region 6 of a rotor winding according to another embodiment. FIG. 2 illustrates a longitudinal section which is located along the non-illustrated rotation axis 1 and now clearly also shows the first cooling channels 8 in the turns 2.

A cap 28 which covers the end winding 7 will be referred to first of all. Spacers 29, between which outlet channels 23 for the cooling gas are left free, are provided to keep the turns 2 at a distance from the cap 28.

A cap, having a structure which corresponds largely to the cap 28 in the exemplary embodiment according to FIG. 2, must be provided in the exemplary embodiment according to FIG. 1.

The first cooling channels 8, which pass through the rotor winding in an approximately radial direction, can be seen both in the rotor body region 6 and in the end winding 7. In the rotor body region 6, the first cooling channels 8 pass through the sealing wedge 12 and, in the end winding 7, the first cooling channels 8 open into the outlet channels 23 between the rotor winding and the cap 28. The radial alignment of the cooling channels 8 is not in any way essential. Depending on the practical construction, it may be advantageous not to route the first cooling channels 8 at right angles to the rotation axis 1, as illustrated, but to route them bent and/or at an angle significantly different from 90° with respect to the rotation axis 1. Since first cooling channels 8 are also provided in the end winding 7, the provision of third cooling channels 15, as in the exemplary embodiment according to FIG. 1, is superfluous. The structure of the second cooling channels 9, having mouths which can be seen, corresponds largely to the structure according to the exemplary embodiment of FIG. 1, so that it is superfluous to describe them at this point.

The cooling gas inlet takes place along the shaft piece 19, first of all under the end winding 7 and, starting from there, into a slot base channel 30 which is provided in the rotor body 3 and extends underneath the turns 2. The first cooling channels 8 in the rotor body region 6 open into the slot base channel 30. As is illustrated in FIG. 1, it may be possible to dispense with an insulating body 20. However, it is self-evident that the exemplary embodiment which is only diagrammatically illustrated in FIG. 2 may be supplemented, if required, by insulating parts or fillers which carry the cooling gas into the cooling channels 8 and 9, and away from them.

Finally, it should be mentioned as a common feature of FIGS. 1 and 2 that, for reasons of clarity, neither of the two figures shows insulating layers which, according to normal practice, are required between individual turns 2 and/or between the turns 2 and the rotor body 3. For the purposes of a practical construction, such insulating layers must, of course, be considered and be used in accordance with the requirements of the specific case. It is self-evident that such insulating layers may possibly have to have perforations if a cooling channel, for example a first cooling channel 8, has to run through them. Corresponding structures are known per se, in particular from the cited documents, and can be provided, if required, as appropriate.

The rotor winding according to the invention is distinguished by the capability of producing it cost-effectively, and offers exceedingly good capabilities with regard to dissipation of heat that is produced in operation. It is particularly suitable for considerably simplifying the cooling system of a correspondingly constructed rotor of a dynamo-electrical machine and, once again, for providing a considerable improvement over previous practice in the rating limits for dynamo electrical machines which are cooled by air or other gas. The efficiency improvements linked thereto also make a contribution to environmental protection and permit greater conservation of natural resources.

I claim:

1. A rotor winding for an electrical machine, comprising:
   a rotor axis;
   a multiplicity of electrically conductive turns stacked radially relative to said rotor axis, having an interior, and forming a plurality of axial sections as well as a plurality of tangential sections;
   each axial section formed approximately straight, aligned approximately parallel to said rotor axis, having associated first cooling channels aligned meridionally relative to said rotor axis and passing through all of said turns;
   each tangential section bent about said rotor axis, connecting two of said axial sections to one another and having associated second cooling channels, each second cooling channel located in said interior of a respective turn, having a separate cooling flow path from a cooling flow path of said associated axial sections of said turn, and discharging in circumferential direction;
   a rotor body having slots formed therein and two axial ends and shaft pieces each projecting from a respective one of said axial ends and extending under a respective one of said tangential sections, said axial sections disposed partially within said slots and partially outside said rotor body and said tangential sections disposed outside said rotor body; and
   insulating cylinders each extending as far as said rotor body at a distance from a respective shaft piece, said tangential sections each disposed on a respective one of said insulating cylinders at each axial end.

2. The rotor winding according to claim 1, including a rotor body having slots formed therein, said axial sections disposed partially within said slots and partially outside said rotor body, and said tangential sections disposed outside said rotor body.

3. The rotor winding according to claim 2, wherein each of said first cooling channels is located within a respective one of said slots.

4. The rotor winding according to claim 3, including third cooling channels each meandering approximately meridionally, disposed outside a respective one of said axial sections, assigned to a respective one of said axial sections, and disposed between said rotor body and a respective one of said tangential sections connected to said axial section.

5. The rotor winding according to claim 4, including electrically insulating fillers disposed between a plurality of said axial sections disposed tangentially side-by-side relative to said rotor axis, each of said fillers having at least one recess forming a third cooling channel with an adjacent one of said axial sections.

6. The rotor winding according to claim 2, wherein:
a) said rotor body has two axial ends and shaft pieces each projecting from a respective one of said axial ends and extending under a respective one of said tangential sections; and
b) insulating cylinders each extend as far as said rotor body at a distance from a respective shaft piece, said tangential sections each disposed on a respective one of said insulating cylinders at each axial end.

7. The rotor winding according to claim 6, wherein:
a) each of said tangential sections has a middle and two ends and is connected at each of said ends to an axial section;
b) every one of said second cooling channels is open to one of said ends and to said middle;
c) radial walls are disposed between said insulating cylinder and said shaft piece; and
d) each insulating cylinder has an associated hole at each of said ends and at each middle, and said hole leads to an inlet channel or outlet channel formed by said radial walls.

8. The rotor winding according to claim 1, wherein each of said tangential sections has a middle and two ends and is connected at each of said ends to one of said axial sections, and every one of said second cooling channels is open to one of said ends and to said middle.

9. The rotor winding according to claim 1, wherein said axial sections have ends, and each of said tangential sections has two ends each connected to one of said ends of an associated one of said axial sections.

10. The rotor winding according to claim 9, wherein said ends of said axial and tangential sections are brazed together.

11. The rotor winding according to claim 9, wherein each of said tangential sections is aligned at a constant radius relative to said rotor axis.

* * * * *